(12) United States Patent
Liu

(10) Patent No.: US 6,247,849 B1
(45) Date of Patent: Jun. 19, 2001

(54) PROTECTION CAP FOR FIBER COUPLER

(75) Inventor: Ching-Yuan Liu, Tu-Chen (TW)

(73) Assignee: Alliance Fiber Optics Products, Inc., Sunnyvale, CA (US)

( * ) Notice: Subject to any disclaimer, the term of this patent is extended or adjusted under 35 U.S.C. 154(b) by 0 days.

(21) Appl. No.: 09/153,092

(22) Filed: Sep. 14, 1998

(30) Foreign Application Priority Data

Sep. 13, 1997 (TW) .................................................. 86215735

(51) Int. Cl.[7] ....................................................... G02B 6/38
(52) U.S. Cl. ................................ 385/55; 385/58; 385/70; 385/92; 385/94
(58) Field of Search ........................................... 385/55–84

(56) References Cited

U.S. PATENT DOCUMENTS

| | | | |
|---|---|---|---|
| 5,348,487 | * | 9/1994 | Marazzi et al. ........................ 439/138 |
| 5,506,922 | * | 4/1996 | Grois et al. ............................... 385/75 |
| 5,883,995 | * | 3/1999 | Lu ............................................. 385/60 |
| 6,041,155 | * | 3/2000 | Anderson et al. ..................... 385/139 |
| 6,076,973 | * | 6/2000 | Lu ............................................. 385/60 |

\* cited by examiner

*Primary Examiner*—Robert H. Kim
*Assistant Examiner*—Andrew H. Lee

(57) ABSTRACT

A protection cap for use with a fiber coupler having at least a first housing comprises a casing defining a passage therethrough for receiving at least a portion of the housing, and a covering lid pivotally assembled to the casing for enclosing an end of the passage.

15 Claims, 4 Drawing Sheets

PROTECTION CAP FOR FIBER COUPLER

FIELD OF THE INVENTION

The present invention relates to a protection cap, and more particularly to a protection cap for a fiber coupler for preventing dust and foreign debris from soiling the fiber coupler.

DESCRIPTION OF PRIOR ART

Referring to FIG. 3, a conventional fiber coupler 60 comprises a coupling housing 68. The coupling housing 68 defines a recess 66 for securely receiving a fiber plug (not shown) therein. A guiding slot 64 is defined on a sidewall 68a thereof for correctly receiving a guiding wedge (not shown) of the fiber plug. A top surface 68b of the housing 68 defines a retaining recess 62 for engaging with a fastening tab of the fiber plug. By this arrangement, the fiber plug can be fixedly attached to the housing 68 by the engagement between the fastening tab and the retaining recess 62.

However, when the fiber plug is not inserted into the recess 66 of the housing 68, the recess 66 and the guiding slot 64 are exposed without any protection to an exterior thereof. Thus, dusts, debris and even insects may easily enter the housing 68. Once the housing 68 is soiled, the light transmission capability and accuracy of the coupler 60 may be adversely affected. In order to protect the housing 68 from being soiled, a plug 70 is inserted into the recess 66 before the fiber plug is inserted. When the plug 70 is seated, the guiding slot 64 is also sealed. Before the fiber plug is inserted, the plug 70 is firstly removed therefrom. However, the plug 70 may be easily misplaced, and when the fiber plug is removed, the housing 68 is remains open to an exterior thereof and may become soiled. Furthermore, since a laser beam continuously passes through the fiber, an operator's eyes may easily be injured after the plug 70 is removed.

Referring to FIG. 4, another conventional fiber coupler 80 is shown. The coupler 80 includes a coupling housing 88, a metal retaining plate 82, a protection lid 84, and a coil spring 86. The housing 88 defines a recess 884 for receiving a fiber plug therein. A metal retaining plate 82 is seated in a top face 88b of the housing 88 which also defines a fastening recess 882. A guiding slot 886 is defined in a side wall 88a of the housing 88 for receiving a guiding wedge of a fiber plug therein.

The protecting lid 84 forms a pair of mounting lugs 840 on a side thereof. The top face 88b further includes a pair of supporting lugs 820 corresponding to the mounting lugs 840. The protecting lid 84 is pivotally assembled to the housing 88 by means of a pin shaft 822 which extends through the supporting lug 820 and the mounting lug 840. The coil spring 86 is arranged on the pin shaft 822 such that the recess 884 is sealed by the protecting lid 84. By this arrangement, the housing 88 is be protected by the lid 84 and the laser beam is also confined therein. However, the guiding slot 886 is still uncovered when the fiber plug is not seated, thus foreign matter may still enter the housing 88. Furthermore, the assembly of the coupler 80 is complicated because the metal plate 82 needs to be installed in the fastening recess 882 before the protecting lid 84 and the coil spring 86 are assembled which increases manufacturing costs. This increases the manufacturing cost. Furthermore, the mounting plate 82 is not securely attached to the housing 88 and may become lost after a period of usage.

SUMMARY OF THE INVENTION

An objective of this invention is to provide a protection cap for preventing foreign debris from settling within a housing of the coupler.

In order to achieve the objective set forth, the protection cap includes a cap housing defining a recess for receiving a portion of a fiber coupler therein. The cap housing includes a fastening tab adapted for engaging with a portion of the fiber coupler thereby providing a seal to the coupler.

These and additional objects, features, and advantages of the present invention will become apparent after reading the following detailed description of the preferred embodiment of the invention taken in conjunction with the appended drawings.

DETAILED DESCRIPTION OF PREFERRED EMBODIMENT

Figure 1:
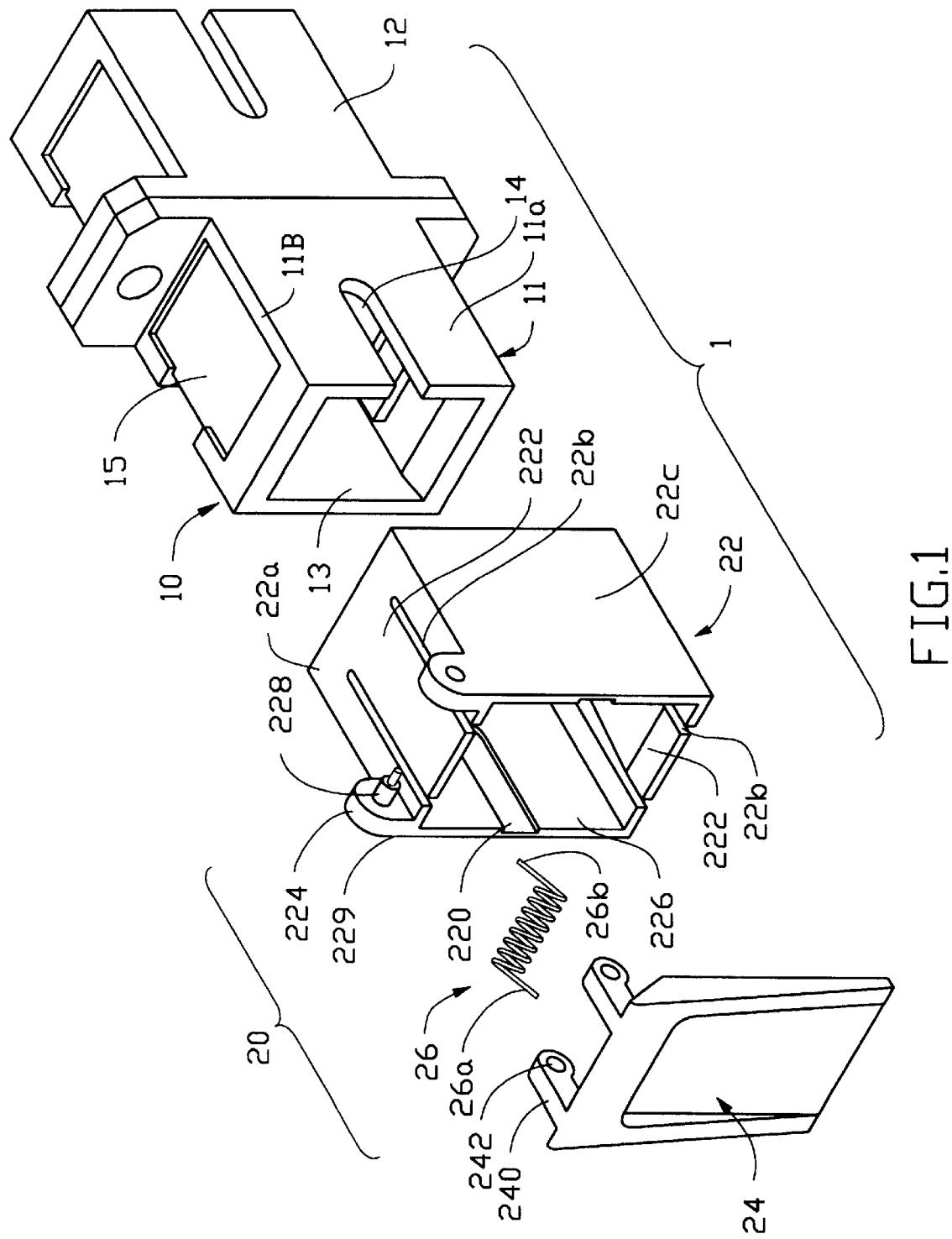
FIG. 1 is an exploded, perspective view of a protection cap in accordance with the present invention.
Figure 2:
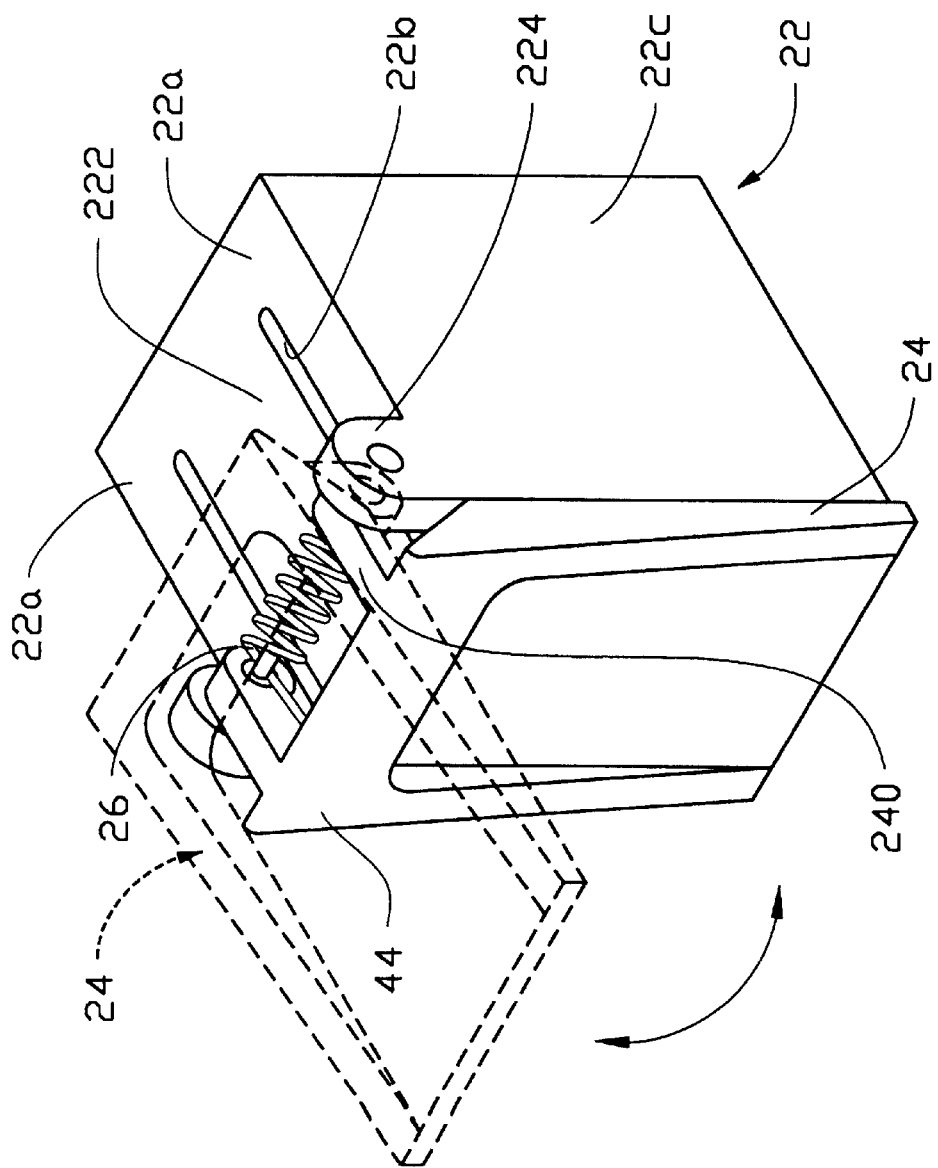
FIG. 2 is an assembled view of a fiber coupler on which the protection cap is mounted.
Figure 3:
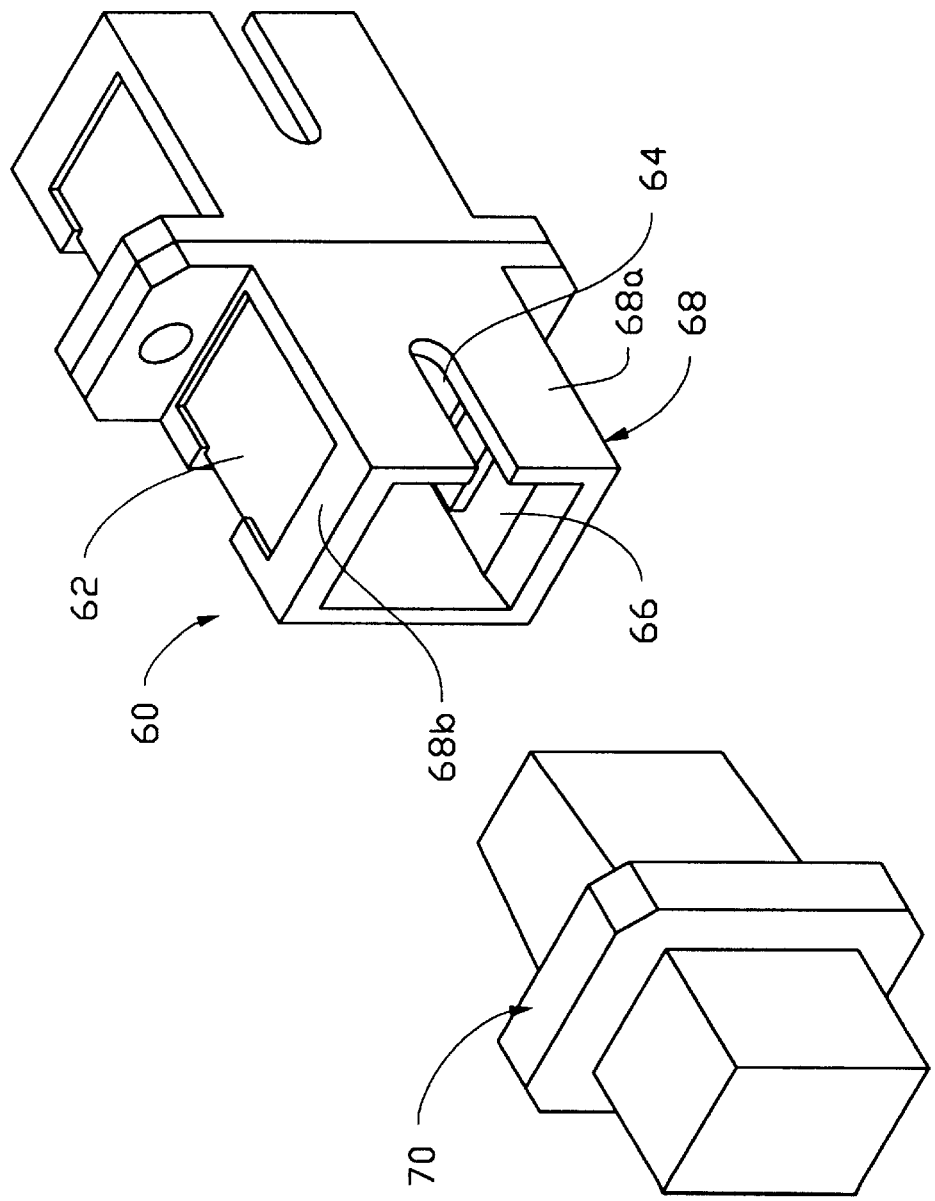
FIG. 3 is an assembled view of a conventional fiber coupler.
Figure 4:
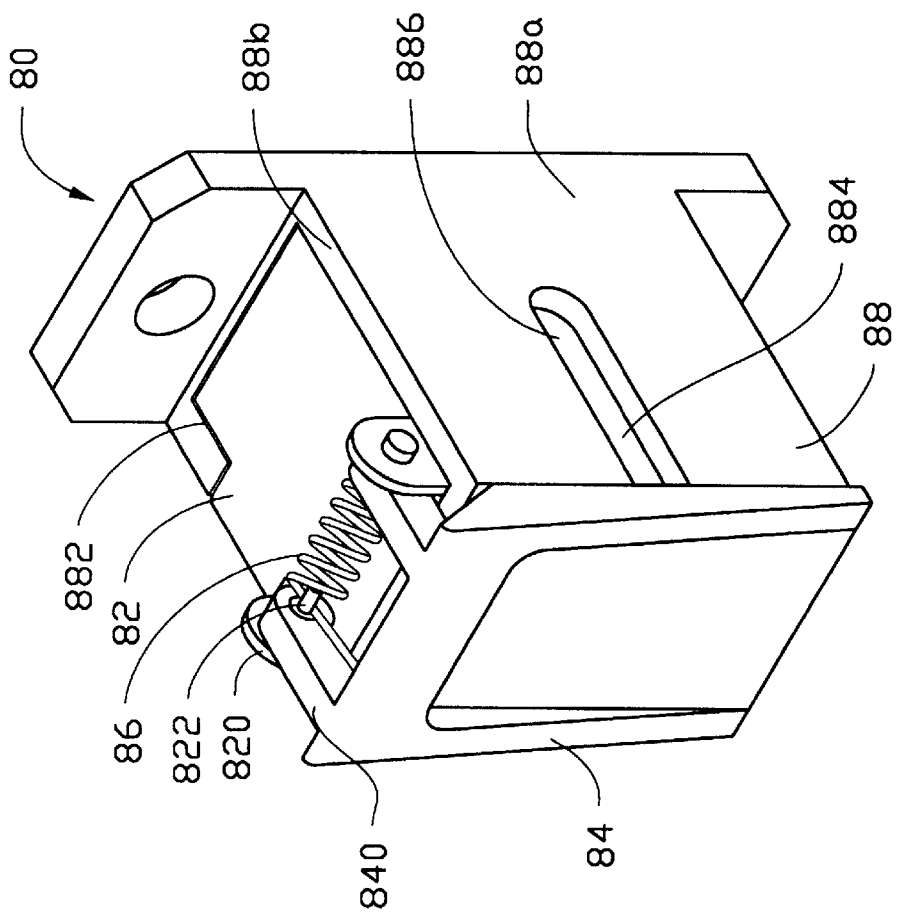
FIG. 4 is an assembled view of another conventional fiber coupler.

Referring to FIGS. 1 and 2, a fiber coupler 10 is assembled with a protection cap 20 to prevent the coupler 10 from being soiled.

The fiber coupler 10 includes a first housing 11 and a second housing 12 interconnected with each other. Since the first housing 11 and the second housing 12 have the same configuration, only the first housing 11 will be described.

The first housing 11 defines a receiving recess 13 for optically connecting a fiber plug therein. A guiding slot 14 is defined in a sidewall 11a of the housing 11. The housing 11 further defines a fastening recess 15 in a top face 11b thereof The protection cap 20 includes a casing 22, a covering lid 24 pivotally mounted to the casing 22, and a coil spring 26 providing a biasing force for the covering lid 24. The casing 22 defines a passage 226 for insertion of the housing 11 of the fiber coupler 10 may insert therein. A top face 22a of the casing 22 defines an opening 22b and an anchoring tab 222 is cantilevered from an edge thereof. The anchoring tab 222 may interferentially engage with the fastening recess 15 of the first housing 11. The bottom face (not labeled) of the first housing 11 is also provided with a fastening recess (not labeled) for engaging with the corresponding anchoring tab 222 of the casing 22. By this arrangement, the casing 22 is securely attached to the first housing 11. When the casing 22 is assembled to the first housing 11, the guiding slot 14 is completely sealed by a side wall 22c of the casing 22. On the other hand, an inner side of the side wall 22c is provided with a groove 220 corresponding to the guiding slot 14 for receiving a guiding wedge of a fiber plug (not shown).

The upper face 22a of the casing 22 is further provided with a pair of supporting lugs 224 each having a pin shaft 228 assembled thereon. The covering lid 24 includes a pair of supporting arms 240 extending from an edge of the covering lid 24. Each supporting arm 240 defines a shaft hole 242 corresponding to the pin shaft 228. By this arrangement, the covering lid 24 is pivotally assembled to the supporting lugs 224 of the casing 22. One end 26a of the spring 26 abuts against the covering lid 24, and is anchored on the casing 22 and the other end 26b abuts against the casing 22 is anchored on the covering lid 24. When the coil spring 26 is assembled to the pin shaft 228, a biasing force is provided to the covering lid 24 such that the passage 226 can be automatically sealed by the covering lid 24.

When the protection cap 20 is assembled to the first housing 11, the guiding slot 14 and the receiving recess 13 are completely sealed by the protection cap 20. The covering lid 24 can be opened for insertion a fiber plug (not shown) into the receiving recess 13 and immediately after the fiber plug is removed, the covering lid 24 resumes its closed position. Thus, the defects of conventional coupler can be completely solved by the provision of the present invention.

While the present invention has been described with reference to a specific embodiment, the description is illustrative of the invention and is not to be construed as limiting the invention. Various modifications to the present invention can be made to the preferred embodiment by those skilled in the art without departing from the true spirit and scope of the invention as defined by the appended claims. Therefore, persons of ordinary skill in this field are to understand that all such equivalent structures are to be included within the scope of the following claims.

I claim:

1. A protection cap for a fiber coupler, the fiber coupler having at least a first housing defining a slot in a side wall thereof, the protection cap comprising:

a casing having no slot in side walls thereof and defining a passage therethrough for receiving at least a portion of said housing thereby covering the slot; and a covering lid pivotally assembled to said casing for enclosing an end of said passage.

2. A protection cap as recited in claim 1, wherein said covering lid includes a pair of supporting arms pivotally assembled to corresponding supporting lugs formed integrally on said casing.

3. A protection cap as recited in claim 1, further including a coil spring arranged between said covering lid and said casing.

4. A protection cap as recited in claim 3, wherein an end of said coil spring abuts against said covering lid and the other end abuts against said casing.

5. A protection cap as recited in claim 1, wherein said casing includes at least an anchoring tab interferentially engaged with a fastening recess defined in a said housing.

6. A fiber coupler, comprising:

a coupling housing including at least a first housing, said first housing defining a fully empty rectangular receiving recess for optically connecting a fiber plug therein, and a guiding slot defined in a side wall of said housing thereof;

a casing defining a passage therethrough for receiving at least a portion of said housing thereby covering the guiding slot; and a covering lid pivotally assembled to said casing for enclosing an end of said passage.

7. A fiber coupler as recited in claim 6, wherein said housing includes a fastening recess.

8. A fiber coupler as recited in claim 7, wherein said casing includes a fastening tab for engaging with said fastening recess of said housing.

9. A fiber coupler as recited in claim 6, wherein said coupling housing further comprising a second housing interconnected with said first housing.

10. A fiber coupler as recited in claim 6, wherein said covering lid includes a pair of supporting arms pivotally assembled to corresponding supporting lugs integrally formed on said housing.

11. A fiber coupler as recited in claim 6, further including a coil spring arranged between said covering lid and said casing.

12. A fiber coupler as recited in claim 11, wherein an end of said coil spring abuts against said covering lid and the other end abuts against said casing.

13. A fiber coupler as recited in claim 6, wherein said casing includes at least an anchoring tab engaged with a fastening recess defined in said housing.

14. A fiber coupler including:

a coupling housing comprising a first housing and a second housing interconnecting to each other, both of said first housing and said second housing respectively defining receiving recesses in alignment with each other;

a casing defining a passageway therethrough receiving at least one of said first and said second housings in a coaxial arrangement a distal end of said at least one of said first and second housings located adjacent an outer end of said casing; and a covering lid assembled to said casing at said outer end thereof and coving the outer end of said casing and the corresponding receiving recess of said at least one of said first housing and said second housing.

15. A fiber coupler as recited in claim 14, wherein said first housing and said second housing are identical with each other.

* * * * *